United States Patent
Andritz et al.

(10) Patent No.: US 8,838,398 B2
(45) Date of Patent: Sep. 16, 2014

(54) TURBINE-GENERATOR HYDROGEN SEAL OIL SYSTEM DIAGNOSIS

(75) Inventors: Jeffrey James Andritz, Altamont, NY (US); James Daniel Antalek, Valatie, NY (US); Daniel James Fitzmorris, Clifton Park, NY (US); Anthony James George, Clifton Park, NY (US); Abby Marie Magro, West Hartford, CT (US); Kevin Jon O'Dell, Rensselaer, NY (US); Fotios Raftelis, Albany, NY (US); Steven Paul Scarlata, Wynantskill, NY (US)

(73) Assignee: General Electric Company, Schenectady, NY (US)

( * ) Notice: Subject to any disclaimer, the term of this patent is extended or adjusted under 35 U.S.C. 154(b) by 847 days.

(21) Appl. No.: 12/725,752

(22) Filed: Mar. 17, 2010

(65) Prior Publication Data
US 2011/0231111 A1  Sep. 22, 2011

(51) Int. Cl.
*G01M 3/00* (2006.01)
*H02K 9/24* (2006.01)

(52) U.S. Cl.
CPC ........................... *H02K 9/24* (2013.01)

USPC ........................................................... 702/34

(58) Field of Classification Search
USPC ........................................................... 702/34
See application file for complete search history.

(56) References Cited

U.S. PATENT DOCUMENTS 4,792,911 A * 12/1988 Gonzalez et al. ............. 702/185
5,186,277 A    2/1993 Snuttjer et al.

* cited by examiner

*Primary Examiner* — Tung S Lau
(74) *Attorney, Agent, or Firm* — Ernest Cusick; Hoffman Warnick LLC

(57) ABSTRACT

A hydrogen cooled generator having a system for diagnosing problems associated with a seal oil system. Included is a shaft having a turbine end and a collector end; a first shaft seal located about the shaft at the turbine end; a second shaft seal located about the shaft at the collector end; a first set of sensors for measuring seal oil pressure differentials across both shaft seals; a second set of sensors for measuring seal oil temperature differentials across both shaft seals; a third sensor for measuring a hydrogen side seal oil flow rate; and a system for analyzing data collected from at least two sensors to diagnose the shaft seals.

13 Claims, 3 Drawing Sheets

| Constant ΔP | ΔT ↑ | ΔT constant | ΔT ↓ |
|---|---|---|---|
| Q ↑ | No problem | Seal Problem | Seal Problem |
| Q constant | Abnormal result | No problem | Seal problem |
| Q ↓ | Abnormal result | Abnormal result | No Problem |

TURBINE-GENERATOR HYDROGEN SEAL OIL SYSTEM DIAGNOSIS

BACKGROUND OF THE INVENTION

The subject matter disclosed herein relates to the art of hydrogen cooled generators and, more particularly, to a system for diagnosing problems associated with a seal oil system.

Hydrogen cooled generators include a seal oil or lubricant drain system that includes a detraining tank. The detraining tank allows any entrained hydrogen to escape from the lubricant. After the hydrogen is removed, the lubricant is reintroduced to the generator. In operation, the lubricant flows along rotating components of the generator and picks up hydrogen before passing into the detraining tank. In the detraining tank, the hydrogen escapes or rises from the lubricant. The lubricant accumulates and eventually flows over a standpipe or through a control valve and passes towards a recycling tank.

Given the nature of hydrogen cooled generators, the ability to identify and fix problems associated with the seal oil system sooner than later can be important. Damage to hydrogen seals many times are not found until after the unit has been operating with the compromised system for an extended period of time. One reason for this is the difficulty in diagnosing problems. For instance, high hydrogen consumption may be considered an indicator of a seal problem. However, high hydrogen consumption can also be caused by other problems, such as leakage through static seals.

BRIEF DESCRIPTION OF THE INVENTION

A first aspect of the disclosure provides a system for diagnosing a seal oil system, comprising: a first set of sensors for measuring a seal oil pressure differential across a shaft seal; a second set of sensors for measuring a seal oil temperature differential across the shaft seal; a third sensor for measuring a hydrogen side seal oil flow rate; and a system for analyzing data collected from at least two of the first set of sensors, second set of sensors and third sensor in order to diagnose the seal oil system.

A second aspect of the disclosure provides a generator, comprising: a shaft having a turbine end and a collector end; a first shaft seal located about the shaft at the turbine end; a second shaft seal located about the shaft at the collector end; a first set of sensors for measuring seal oil pressure differentials across both shaft seals; a second set of sensors for measuring seal oil temperature differentials across both shaft seals; a third sensor for measuring a hydrogen side seal oil flow rate; and a system for analyzing data collected from at least two sensors to diagnose the shaft seals.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIG. 3 depicts a look-up table for diagnosing potential seal system problems.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

Figure 1:
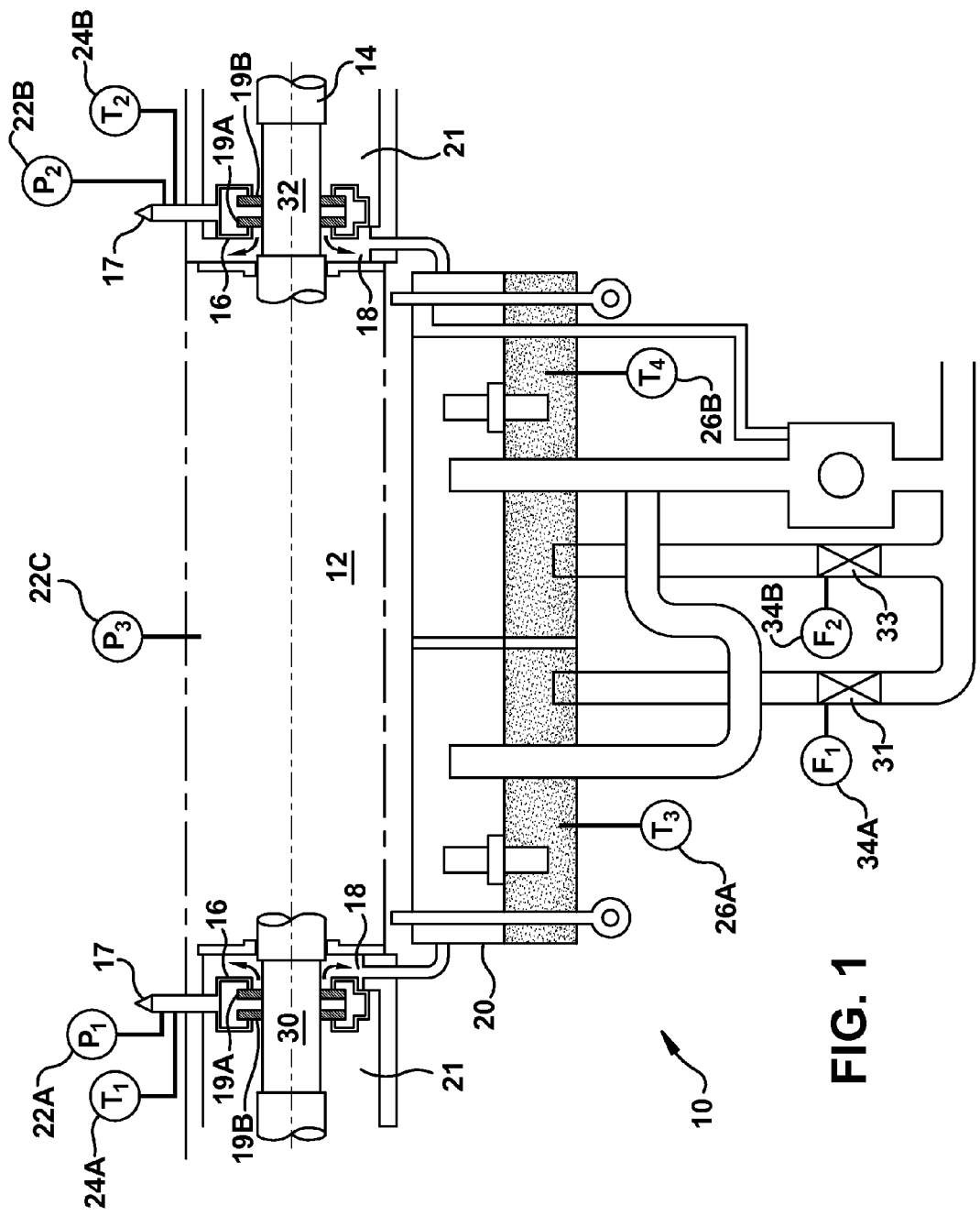
FIG. 1 is a cross-section of a hydrogen cooled generator having temperature, pressure and flow sensors in accordance with an exemplary embodiment.

Referring to the drawings, FIG. 1 shows an illustrative cross-section of a hydrogen cooled generator 10 that generally includes a body 12 and a rotary member or rotating shaft 14. Rotating shaft 14 includes a first or turbine end 30 and a second or collector end 32. Both turbine end 30 and collector end 32 include a hydrogen shaft seal 16. Each hydrogen shaft seal 16 includes a pair of seal rings 19A, 19B that are fitted about the surface of the rotating shaft 14. Each seal ring pair 19A, 19B includes a hydrogen side seal ring 19A and an external side seal ring 19B. Both hydrogen shaft seals 16 are adapted to receive a lubricant, i.e., seal oil, from inlet 17, which is directed through the seal rings 19A, 19B and onto the surface of the rotating shaft 14. Seal oil prevents hydrogen gas from escaping the generator body 12 particularly in regions about the hydrogen shaft seals 16. Seal oil that flows toward the hydrogen side 18 (shown by dotted arrows) is circulated into a hydrogen detraining tank 20 that removes hydrogen gas entrained within the seal oil. The shaft seals 16, seal oil and detraining tank 20 thus form a seal oil system that prevents the escape of hydrogen gas.

Hydrogen cooled generator 10 also includes a set of pressure, temperature and flow sensors that diagnose the seal oil system before more advanced symptoms such as increased hydrogen consumption become evident. For the purposes of this disclosure, the term diagnose may include, e.g., evaluation, analysis, identifying and locating problems, etc. Note that the exact placement of the sensors is not intended to be limiting and the placements shown are for illustrative purposes only. In this illustrative embodiment, the seal oil system includes pressure sensors 22A, 22B, and 22C that measure differential pressure across shaft seals 16. In particular, pressure sensors 22A, 22B, 22C measure a seal oil pressure differential between the hydrogen side 18 and the external side 21. For instance, a pressure differential can be measured between pressure sensors 22A and 22C ($P_1$-$P_3$), as well between pressure sensors 22B and 22C ($P_2$-$P_3$).

Temperature sensors 24A/26A ($T_1$-$T_3$) and 24B/26B ($T_2$-$T_4$) measure seal oil temperature differential across the shaft seals 16 (i.e., between the hydrogen side 18 and the external side 21). In this example, temperature sensors 26A, 26B measure seal oil temperature in the detraining tank 20, and temperature sensors 24A, 24B measure seal oil temperature at the external side seal rings 19B.

A pair of flow sensors 34A and 34B measure seal oil flow through the detraining tank 20, which reflects the hydrogen side flow through the shaft seals 16. In this embodiment, the flow sensors 34A and 34B are located at control valves 31 and 33, respectively.

The sensors allow for the continuous and/or simultaneous collection of pressure, temperature and/or flow information, which can be collectively analyzed to diagnose seal oil system problems. Differential pressure across the shaft seals 16, temperature rise across the shaft seals 16 and oil flow passing through the shaft seals 16 to the hydrogen side 18 can indicate damage to the system hardware before other indicators such as increased hydrogen consumption will become apparent.

For example, changes in differential pressure across the shaft seals 16 can indicate problems with a seal oil pressure regulator. Changes in oil temperature rise or changes in hydrogen side seal oil flow can indicate damage to or incorrect positioning of the seal rings. Combinations of these parameters can be utilized to more particularly monitor and ascertain the health of the system as well as diagnose potential problems. Note that both the collector end 32 and turbine end 30 include their own set of sensors, thus allowing a diagnosis at a particular end.

As an example, high inlet oil temperature at a constant differential pressure would require higher hydrogen side flow rates due to the decreased viscosity of the seal oil. Accordingly, measuring flow in this case may suggest a problem with the system, but when analyzed within the context of the oil temperature readings it may be determined that the system is operating properly. In this same situation if the flow rate increased and the temperature differential decreased, this may indicate damage to or a change in position of the seal rings 19A, 19B. In one illustrative embodiment, a given set of sensor readings may be entered into a control system, which programmatically analyzes the data to generate a diagnosis in an automated fashion. For instance, a flow rate increase above a first predetermined threshold at the collector end along with a temperature differential decrease below a second predetermined threshold at the collector end would result in a diagnosis of a seal ring compromise at the collector end. Accordingly, this system will enable operators to identify and locate problems with the seal oil system sooner and without having to shutdown the machine, degas the system and open the machine for inspection searching for the root cause.

Figure 2:
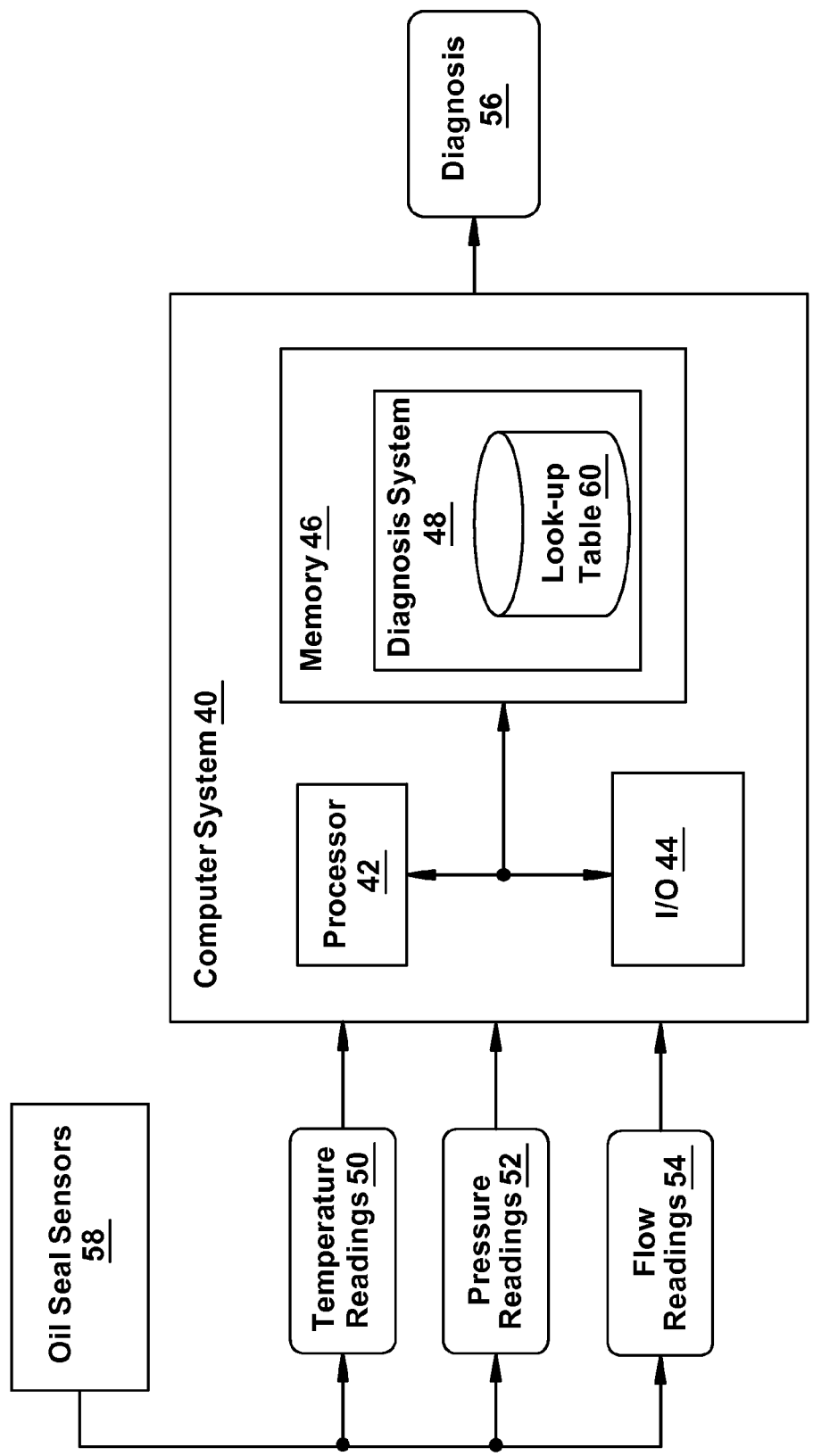
FIG. 2 is a block diagram illustrating a computer system for processing the sensor data.

FIG. 2 depicts a computer system 40 for inputting temperature readings 50, pressure readings 52 and flow readings 54 from a set of oil seal sensors 58 and generating a diagnosis 56. Computer system 40 includes a diagnosis system 48 stored in memory 46. Diagnosis system 48 may for instance comprise a computer program product stored on a computer readable medium, which when executed by processor 42, generates diagnosis 56 based on inputted readings 50, 52, 54. Diagnosis 56 may be generated in any manner, e.g., as output within a graphical user interface, and may contain any type of information, e.g., one or more possible seal oil system issues. Diagnosis system 48 may utilize any technique for determining a diagnosis 56 including, e.g., a look-up table 60, a rule based system, a clustering application, etc. For example, in the case of a look-up table 60, data collected from each of the three different sensors could be compared with entries in a three dimensional table (e.g., a matrix, data structure, database, etc.) to identify a particular potential problem. Depending on the situation, resulting diagnosis 56 may include a set of potential problems, a single potential problem or an indication of no problems.

FIG. 3 depicts an illustrative look-up table for use in diagnosing issues with a seal oil system. The depicted table assumes a constant pressure (P) differential. Accordingly, if for example there is a rising flow rate (Q) and a rising temperature (T) differential, then no problems are indicated. If however, there is a rising flow rate and a decreasing or constant temperature differential, then a seal problem is indicated.

Referring again to FIG. 2, it is understood that computer system 40 may be implemented using any type of computing device. Such a computing device generally includes a processor 42, input/output (I/O 44), memory 46, and bus. The processor 42 may comprise a single processing unit, or be distributed across one or more processing units in one or more locations, e.g., on a client and server. Memory 46 may comprise any known type of data storage, including magnetic media, optical media, random access memory (RAM), read-only memory (ROM), a data cache, a data object, etc. Moreover, memory may reside at a single physical location, comprising one or more types of data storage, or be distributed across a plurality of physical systems in various forms.

I/O 44 may comprise any system for exchanging information to/from an external resource. External devices/resources may comprise any known type of external device, including a monitor/display, speakers, storage, another computer system, a hand-held device, keyboard, mouse, voice recognition system, speech output system, printer, facsimile, pager, etc. The bus provides a communication link between each of the components in the computing device and likewise may comprise any known type of transmission link, including electrical, optical, wireless, etc. Although not shown, additional components, such as cache memory, communication systems, system software, etc., may be incorporated.

Access may be provided over a network such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol.

It is understood that in addition to being implemented as a system and method, the features may be provided as one or more program products stored on a computer-readable storage medium, which when run, enables a computer system 40 to provide a Diagnosis. To this extent, the computer-readable storage medium may include program code, which implements the processes and systems described herein. It is understood that the term "computer-readable storage medium" comprises one or more of any type of physical embodiment of the program code. In particular, the computer-readable storage medium can comprise program code embodied on one or more portable storage articles of manufacture (e.g., a compact disc, a magnetic disk, a tape, etc.), on one or more data storage portions of a computing device, such as memory and/or a storage system.

As used herein, it is understood that the terms "program code" and "computer program code" are synonymous and mean any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like. Further, it is understood that terms such as "component", "subsystem" and "system" are synonymous as used herein and represent any combination of hardware and/or software capable of performing some function(s).

The block diagrams in the figures illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical function(s). It should also be noted that the functions noted in the blocks may occur out of the order noted in the figures. For example, two blocks shown in succession may, in fact, be run substantially concurrently, or the blocks may sometimes be run in the reverse order, depending upon the functionality involved. It will also be noted that each block of the block diagrams can be implemented by special purpose hardware-based systems which perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A system for diagnosing health of a seal oil system, comprising:
    a first set of sensors for measuring a seal oil pressure differential across a shaft seal;
    a second set of sensors for measuring a seal oil temperature differential across the shaft seal;
    a third set of sensors for measuring a hydrogen side seal oil flow rate that is indicative of a hydrogen side flow through the shaft seal, wherein the third set of sensors for measuring the hydrogen side seal oil flow rate is located in a drain within a detraining tank of the system; and
    a system for analyzing data collected from at least two of the first set of sensors, the second set of sensors and the third set of sensors in order to diagnose the health of the seal oil system as a function of a combination of the seal oil pressure differential across the shaft seal, the seal oil temperature differential across the shaft seal, and the hydrogen side seal oil flow rate.

2. The system of claim 1, further comprising sensors for measuring seal oil pressure differential and seal oil temperature differential across a second shaft seal.

3. The system of claim 1, wherein the system for analyzing data comprises a computing device.

4. The system of claim 1, wherein the seal oil system is contained within a hydrogen cooled generator.

5. The system of claim 1, wherein a diagnosis includes identifying a potential failure.

6. The system according to claim 1, wherein a differential pressure across the shaft seal, a temperature rise across the shaft seal and an oil flow passing through the shaft seal to the hydrogen side indicate damage to the seal oil system.

7. The system of claim 3, wherein the computing device utilizes a look-up table to diagnose the seal oil system.

8. A generator, comprising:
    a shaft having a turbine end and a collector end;
    a first shaft seal located about the shaft at the turbine end;
    a second shaft seal located about the shaft at the collector end;
    a first set of sensors for measuring seal oil pressure differentials across both shaft seals;
    a second set of sensors for measuring seal oil temperature differentials across both shaft seals;
    a third set of sensors for measuring a hydrogen side seal oil flow rate that is indicative of a hydrogen side flow through the first and second shaft seals, wherein the third set of sensors for measuring the hydrogen side seal oil flow rate is located in a drain within a detraining tank; and
    a system for analyzing data collected from at least two sets of sensors to diagnose the health of the shaft seals as a function of a combination of the seal oil pressure differential across the first and second shaft seals, seal oil temperature differential across the first and second shaft seals, and the hydrogen side seal oil flow rate.

9. The generator of claim 8, wherein the system for analyzing data comprises a computing device.

10. The generator of claim 8, wherein the generator is a hydrogen cooled generator.

11. The generator of claim 8, wherein a diagnosis includes identifying potential failures.

12. The generator according to claim 8, wherein a differential pressure across the first and second shaft seals, a temperature rise across the first and second shaft seals and an oil flow passing through the first and second shaft seals to the hydrogen side indicate damage to the seal oil system.

13. The generator of claim 9, wherein the computing device utilizes a look-up table to diagnose the shaft seals.

* * * * *